United States Patent
Li et al.

(10) Patent No.: US 12,318,752 B2
(45) Date of Patent: Jun. 3, 2025

(54) COMPOSITE MATERIAL AND A METHOD OF PREPARING THE SAME

(71) Applicant: AGENCY FOR SCIENCE, TECHNOLOGY AND RESEARCH, Singapore (SG)

(72) Inventors: Xu Li, Singapore (SG); Jiating He, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 941 days.

(21) Appl. No.: 17/427,407

(22) PCT Filed: Jan. 31, 2020

(86) PCT No.: PCT/SG2020/050045
§ 371 (c)(1),
(2) Date: Jul. 30, 2021

(87) PCT Pub. No.: WO2020/159446
PCT Pub. Date: Aug. 6, 2020

(65) Prior Publication Data
US 2022/0305455 A1    Sep. 29, 2022

(30) Foreign Application Priority Data

Jan. 31, 2019   (SG) .............................. 10201900921S (51) Int. Cl.
| | | |
|---|---|---|
| *B01J 20/10* | (2006.01) | |
| *B01J 20/02* | (2006.01) | |
| *B01J 20/26* | (2006.01) | |
| *B01J 20/28* | (2006.01) | |
| *B01J 20/32* | (2006.01) | |

(52) U.S. Cl.
CPC ......... *B01J 20/103* (2013.01); *B01J 20/0229* (2013.01); *B01J 20/264* (2013.01); *B01J 20/28007* (2013.01); *B01J 20/28016* (2013.01); *B01J 20/2805* (2013.01); *B01J 20/28078* (2013.01); *B01J 20/3236* (2013.01); *B01J 20/3272* (2013.01)

(58) Field of Classification Search
CPC ...... B01J 20/10; B01J 20/103; B01J 20/0229; B01J 20/264; B01J 20/28007; B01J 20/28016; B01J 20/2805; B01J 20/28078; B01J 20/3236; B01J 20/3272
USPC ...................................................... 502/406
See application file for complete search history.

(56) References Cited

U.S. PATENT DOCUMENTS

| | | | |
|---|---|---|---|
| 5,798,055 A | 8/1998 | Blinka et al. | |
| 6,284,153 B1 | 9/2001 | Miller et al. | |
| 7,939,103 B2 | 5/2011 | Dahne et al. | |
| 2012/0207795 A1 | 8/2012 | Zink et al. | |
| 2015/0296852 A1 | 10/2015 | Penhasi et al. | |
| 2016/0032180 A1* | 2/2016 | Agrawal | A61K 8/8176 |
| | | | 507/219 |

FOREIGN PATENT DOCUMENTS

| | | |
|---|---|---|
| KR | 2015-0109566 A | 10/2015 |
| KR | 101615003 B1 | 4/2016 |
| KR | 101697127 B1 | 1/2017 |
| WO | WO-2005/110592 A1 | 11/2005 |
| WO | WO-2012/009448 A2 | 1/2012 |
| WO | WO-2019/172845 A1 | 9/2019 |

OTHER PUBLICATIONS

Extended European Search Report in EP Application No. 20749243.0 dated Sep. 21, 2022, 12 pages.
Eurov et al., "Monodisperse Core-Shell Particles Composed of Magnetite and Dye-Functionalized Mesoporous Silica", Technical Physics Letters, American Institute of Physics, vol. 43, No. 8, Sep. 3, 2017, pp. 716-719.
Cirillo et al., "Nanoiron-Based Composite Oxygen Scavengers for Food Packaging", Composites Materials for Food Packaging, Jan. 1, 2018, pp. 209-234.
Search Report and Written Opinion in Singapore Application No. 11202108224V dated Sep. 28, 2021, 10 pages.
Notice of Reasons for Rejection in JP Application No. 2021-544590 dated Feb. 6, 2024, 7 pages.
Second Office Action in EP Application No. 20749243.0 dated Mar. 11, 2024, 10 pages.
Li et al., "Highly Efficient Methylene Blue Dyes Removal From Aqueous Systems by Chitosan Coated Magnetic Mesoporous Silica Nanoparticles", J Porous Mater, vol. 22, 2015, pp. 1383-1392.
Search Report and Written Opinion in International Application No. PCT/SG2020/050045 dated Mar. 31, 2020, 12 pages.

* cited by examiner

*Primary Examiner* — Edward M Johnson
(74) *Attorney, Agent, or Firm* — Marshall, Gerstein & Borun LLP

(57) ABSTRACT

There is provided a composite material comprising a porous silica particle, a plurality of metal particles disposed within the pores of said silica particle and a polymeric coating that at least partially encapsulates said silica particle. There is also provided a method of preparing a composite material, comprising the step of mixing a solution containing a plurality of activated metal and silica particles with a polymer solution to thereby form said composite material, wherein said composite material comprises a porous silica particle, a plurality of metal particles disposed within the pores of said silica particle and a polymeric coating that at least partially encapsulates said silica particle.

20 Claims, 3 Drawing Sheets

COMPOSITE MATERIAL AND A METHOD OF PREPARING THE SAME

REFERENCES TO RELATED APPLICATIONS

This application claims priority to Singapore application number 10201900921S filed on 31 Jan. 2019, the disclosure of which is hereby incorporated by reference.

TECHNICAL FIELD

The present invention relates to a composite material, a method of preparing the same, use of the composite material and a method of forming an oxygen scavenging or oxygen barrier film.

BACKGROUND ART

Oxygen presented in packaging is a key factor that affects the quality of packaged food products. Perishable foods such as fruits and vegetables are very sensitive to oxygen and deteriorate easily. Such deterioration may cause loss of vitamin C, oxidative rancidity of fats and oils, growth of microorganisms and discoloration. One of the main purposes of food packaging is to protect the food packaged against oxygen, thus maintaining food items quality with prolonged shelf life. Many efforts have been done to provide a packaging with good barrier property against oxygen. At the same time, modified atmosphere and vacuum packaging are well-known methods to reduce oxygen content in the package prior sealing. However, the residue oxygen (oxygen trapped in the food or present in the headspace) in the packaging cannot be completely removed by these technologies. Moreover, high cost and complicated operations are some issues related to modified atmosphere and vacuum packaging. Thus, the development of effective oxygen scavenger is highly desired.

Oxygen scavengers scavenge oxygen through oxidation of active compounds such as iron powder, ascorbic acid, enzymes, unsaturated hydrocarbon, photosensitive polymers, etc. Organic and unsaturated hydrocarbon scavengers are relatively unstable and emits unwanted odor after oxidation. Among these oxygen scavengers, iron based oxygen scavenger is the most well-known and commercially available product due to its high scavenging efficiency, low cost and safety. Iron particles with smaller sizes show higher scavenging capacity compared to the larger particles due to the large amount of reactive surface atoms. Thus, nanosized iron particles have much potential for use in oxygen scavenging. However, such small iron particles are too active and may explode during production, and are therefore difficult to be produced or handled during industry production.

Porous particles with nanosized channels or pores are promising candidates to act as a carrier and protector to hold the nanosized iron particles in the channels or pores to avoid the aggregation of iron particles and enhance the contact of oxygen and iron nanoparticles, which can lead to improvement in the oxygen scavenging capacity. However, limited loading of iron particles into the nanosized channels or pores may result in the limitation of the oxygen scavenging performance. The iron particles may be oxidized during preparation and reduce the oxygen scavenging capacity. The iron/silica nanoparticles may aggregate together when forming an oxygen barrier layer, leading to an increase in the opacity of the oxygen barrier layer.

Therefore, there is a need to provide a composite material, a method of preparing composite nanoparticle, use of the composite material and a method of forming an oxygen barrier film that overcome or ameliorate one or more of the disadvantages mentioned above.

SUMMARY

In one aspect, the present disclosure relates to a composite material comprising a porous silica particle, a plurality of metal particles disposed within the pores of said silica particle and a polymeric coating that at least partially encapsulates said silica particle.

Advantageously, the polymeric coating acts as a protective layer that uniformly covers the metal/silica particles to avoid the oxidation of the metal particles in the porous silica particle during their preparation, leading to high oxygen scavenging of the metal particles and good dispersion in polymer matrix. Due to the nanoscale thickness of the polymeric coating, the metal particles can still be activated by moisture to scavenge oxygen.

Still advantageously, the silica particle may be functionalized with a silane which promotes the adsorption of the metal nanoparticle, leading to higher metal particle loading in the porous silica particle and therefore improves the oxygen scavenging capacity.

In another aspect, the present disclosure relates to a method of preparing a composite material, comprising the step of mixing a solution containing a plurality of activated metal and silica particles with a polymer solution to thereby form said composite material, wherein said composite material comprises a porous silica particle, a plurality of metal particles disposed within the pores of said silica particle and a polymeric coating that at least partially encapsulates said silica particle.

The method may further comprise a step of by annealing or chemical etching to enlarge the pore size of the silica particle.

Advantageously, through annealing or etching process, the porous silica particle possesses larger pore/channel for holding more metal particles in the composite material.

In another aspect, the present disclosure relates to use of the composite material as defined herein as an oxygen scavenger material.

In another aspect, the present disclosure relates to a method of forming an oxygen scavenging or oxygen barrier film comprising the step of compounding or coating a substrate with a composite material as defined herein.

Advantageously, the polymeric coating avoids oxidation and aggregation of metal/silica particles during compounding process with polymer resin, resulting in transparent oxygen scavenging composite films with high oxygen scavenging capability.

Definitions

The following words and terms used herein shall have the meaning indicated:

The term "composite" as used herein represents material made from two or more constituent materials with significantly different physical or chemical properties that, when combined, produce the material. The individual components remain separate and distinct within the finished material.

The term "oxygen scavenging" as used herein refers to an act of gathering or removing oxygen from an enclosed area or mixture.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a composite material will now be disclosed.

The present disclosure relates to a composite material comprising a porous silica particle, a plurality of metal particles disposed within the pores of said silica particle and a polymeric coating that at least partially encapsulates said silica particle.

The function of the porous silica particle is mainly for hosting the metal particles to achieve uniform dispersion and high scavenging capacity.

The silica particle may be modified with a silane compound. The silane compound may be functionalised with an amino group or a carboxylic group.

The silane compound functionalized with an amino group may be selected from the group consisting of aminomethyltrimethoxysilane, aminomethyltriethoxysilane, aminomethyltripropoxysilane, aminoethyltrimethoxysilane, aminoethyltriethoxysilane, aminoethyltripropoxysilane, aminopropyltrimethoxysilane, aminopropyltriethoxysilane, aminopropyltripropoxysilane, aminopropyltrimethoxyethoxysilane, aminopropylmethyldimethoxysilane, aminopropyl-methyldiethoxysilane, aminopropylmethyldiethoxysilane, aminopropylmethyldibutoxysilane, aminopropylmethyldiisopropenoxysilane, aminopropyldimethylethoxysilane, aminopropyldimethyimethoxysilane, aminopropyldimethylpropoxysilane, aminopropylmethyldiisopropenoxysilane, aminopropyldiisopropylethoxysilane, aminopropylbistrimethylsiloxymethylsilane, aminobutyltrimethoxysilane, or mixtures thereof.

The silane compound functionalized with a carboxylic acid group may be disodium carboxyethyl siliconate. The silane compound functionalized with a carboxylic acid group may be converted from a silane compound functionalized with an amino group after the modification of the silane compound functionalized with an amino group. The silane compound may preferably be aminopropyltriethoxysilane (APTES).

The metal of the metal particle may be selected from Group 8 of the Periodic Table. The metal of the metal particle may be iron. The iron particle may be a zero-valent iron particle in the composite material.

The size of the metal particle may be less than 100 nm, preferably less than 50 nm, and particular preferably less than 5 nm. The size of the metal particle may be in the range of about 1 nm to 100 nm, about 1 nm to 80 nm, about 1 nm to 60 nm, about 1 nm to 50 nm, about 1 nm to 30 nm, about 1 nm to 10 nm, about 1 nm to 5 nm, about 5 nm to 100 nm, about 10 nm to 100 nm, about 30 nm to 100 nm, about 50 nm to 100 nm, about 60 nm to 100 nm, or about 80 nm to 100 nm.

The size of the silica particle may be in the range of about 20 nm to about 1 μm, about 20 nm to about 800 nm, about 20 nm to about 600 nm, about 20 nm to about 500 nm, about 20 nm to about 400 nm, about 20 nm to about 300 nm, about 20 nm to about 100 nm, about 20 nm to about 80 nm, about 20 nm to about 60 nm, about 20 nm to about 50 nm, about 20 nm to about 30 nm, about 30 nm to about 1 μm, about 50 nm to about 1 μm, about 80 nm to about 1 μm, about 100 nm to about 1 μm, about 300 nm to about 1 μm, about 400 nm to about 1 μm, about 500 nm to about 1 μm, about 600 nm to about 1 μm, about 800 nm to about 1 μm, about 50 nm to about 400 nm, or about 100 nm to 300 nm.

The pore size of the porous silica particle may in the range of about 5 nm to about 100 nm, about 5 nm to about 90 nm, about 5 nm to about 80 nm, about 5 nm to about 70 nm, about 5 nm to about 60 nm, about 5 nm to about 50 nm, about 5 nm to about 40 nm, about 5 nm to about 30 nm, about 5 nm to about 20 nm, about 5 nm to about 10 nm, about 10 nm to about 100 nm, about 20 nm to about 100 nm, about 30 nm to about 100 nm, about 40 nm to about 100 nm, about 50 nm to about 100 nm, about 60 nm to about 100 nm, about 70 nm to about 100 nm, about 80 nm to about 100 nm, or about 90 nm to about 100 nm. The pore size of the porous silica material may be preferably in the range of about 10 nm to about 30 nm.

The weight of the metal particles in the composite metal/silica particles may be in the range of about 1 wt % to about 80 wt %, about 1 wt % to about 70 wt %, about 1 wt % to about 60 wt %, about 1 wt % to about 50 wt %, about 1 wt % to about 40 wt %, about 1 wt % to about 30 wt %, about 1 wt % to about 20 wt %, about 1 wt % to about 10 wt %, about 1 wt % to about 5 wt %, about 5 wt % to about 80 wt %, about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, about 70 wt % to about 80 wt %, about 10 wt % to about 70 wt %, about 10 wt % to about 50 wt %, about 30 wt % to about 60 wt %, or about 20 wt % to about 40 wt % based on the dry weight of the silica particles. The weight of the metal particles in the composite metal/silica particles may be preferably in the range of about 20 wt % to about 60 wt % based on the dry weight of the silica particles.

The composite material may further comprise an activator. The activator may be a salt. The salt may be a halide salt. The cation of the halide salt may be a metal selected from Group 1, Group 2 or Group 13 of the Periodic Table of Elements. The anion of the halide salt may be a chloride, a bromide or a fluoride. The activator may be sodium chloride (NaCl), calcium chloride ($CaCl_2$)), aluminium chloride ($AlCl_3$), sodium fluoride (NaF), calcium fluoride ($CaF_2$), aluminium fluoride ($AlF_3$), sodium bromide (NaBr), calcium bromide ($CaBr_2$), aluminium bromide ($AlBr_3$), sodium iodide (NaI), calcium iodide ($CaI_2$), or aluminium iodide ($AlI_3$). The activator may be sodium chloride.

The activator may be trapped inside the pores of the silica particle and be in contact with the metal particles to activate oxygen scavenging. The weight percentage of the activator based on the dry weight of the silica particles after the composite material is dried is about 0.1 wt % to about 10 wt %, about 0.3 wt % to about 10 wt %, about 0.5 wt % to about 10 wt %, about 0.8 wt % to about 10 wt %, about 1 wt % to about 10 wt %, about 3 wt % to about 10 wt %, about 5 wt % to about 10 wt %, about 8 wt % to about 10 wt %, about 0.1 wt % to about 8 wt %, about 0.1 wt % to about 5 wt %, about 0.1 wt % to about 3 wt %, about 0.1 wt % to about 1 wt %, about 0.1 wt % to about 0.8 wt %, about 0.1 wt % to about 0.5 wt % or about 0.1 wt % to about 0.3 wt %.

The polymeric coating may comprise a polymer having a monomer selected from the group consisting of urethane, acrylate, methacrylate, epoxy, ethylene, vinyl alcohol and mixtures thereof. The molecular weight of the polymer may be in the range of about 10,000 to about 500,000, about 20,000 to about 500,000, about 50,000 to about 500,000, about 100,000 to about 500,000, about 200,000 to about 500,000, about 300,000 to about 500,000, about 10,000 to about 300,000, about 10,000 to about 100,000, about 20,000 to about 200,000, about 50,000 to about 200,000, about 100,000 to about 200,000, about 120,000 to about 200,000, about 150,000 to about 200,000.

The thickness of the polymeric coating may be in the range of about 0.5 nm to about 15 nm, about 1 nm to about 15 nm, about 2 nm to about 15 nm, about 3 nm to about 15 nm, about 5 nm to about 15 nm, about 8 nm to about 15 nm, about 10 nm to about 15 nm, about 13 nm to about 15 nm, about 0.5 nm to about 13 nm, about 0.5 nm to about 10 nm, about 0.5 nm to about 8 nm, about 0.5 nm to about 5 nm, about 0.5 nm to about 3 nm, about 0.5 nm to about 2 nm, about 0.5 nm to about 1 nm, about 1 nm to about 5 nm, about 1 nm to about 10 nm, about 5 nm to about 10 nm, or about 2 nm to about 8 nm.

The composite material may have an oxygen scavenging performance in the range of about 210 to about 230 $cm^3/g$, about 210 to about 215 $cm^3/g$, about 210 to about 220 $cm^3/g$, about 210 to about 225 $cm^3/g$, about 215 to about 230 $cm^3/g$, about 220 to about 230 $cm^3/g$, about 225 to about 230 $cm^3/g$, about 215 to about 220 $cm^3/g$, about 220 to about 225 $cm^3/g$ or about 225 to about 230 $cm^3/g$.

Exemplary, non-limiting embodiments of a method of preparing the composite material as described herein will now be disclosed.

The present disclosure relates to a method of preparing a composite material, comprising the step of mixing a solution containing a plurality of activated metal and silica particles with a polymer solution to thereby form said composite material, wherein said composite material comprises a porous silica particle, a plurality of metal particles disposed within the pores of said silica particle and a polymeric coating that at least partially encapsulates said silica particle.

The method may further comprise a step of annealing or chemical etching to enlarge the pore size or channel size of the silica particle.

The annealing may be at a temperature range of about 100° C. to about 700° C., about 100° C. to about 600° C., about 100° C. to about 500° C., about 100° C. to about 400° C., about 100° C. to about 300° C., about 100° C. to about 250° C., about 100° C. to about 200° C., about 100° C. to about 150° C., about 150° C. to about 700° C., about 200° C. to about 700° C., about 250° C. to about 700° C., about 300° C. to about 700° C., about 400° C. to about 700° C., about 500° C. to about 700° C., about 600° C. to about 700° C., or about 250° C. to about 500° C. The annealing step may be preferably at a temperature range of about 250° C. to about 500° C.

The chemical etching may be using an alkali salt solution. The alkali salt may be soluble hydroxides of alkali metals or alkaline earth metals. The alkali salt may be selected from the group consisting of sodium hydroxide, potassium hydroxide, calcium hydroxide and magnesium hydroxide. The alkali salt may preferably be sodium hydroxide.

The amount of alkali salt may be in the range of about 0.01 wt % to about 5 wt %, about 0.01 wt % to about 3 wt %, about 0.01 wt % to about 1 wt %, about 0.01 wt % to about 0.5 wt %, about 0.01 wt % to about 0.3 wt %, about 0.01 wt % to about 0.1 wt %, about 0.01 wt % to about 0.05 wt %, about 0.01 wt % to about 0.03 wt %, about 0.03 wt % to about 5 wt %, about 0.05 wt % to about 5 wt %, about 0.1 wt % to about 5 wt %, about 0.3 wt % to about 5 wt %, about 0.5 wt % to about 5 wt %, about 1 wt % to about 5 wt %, about 3 wt % to about 5 wt % of the silica particle.

The method may further comprise the step of modifying the silica particles with a silane compound. The silane compound may be functionalised with an amino group or a carboxylic group. The amount of silane compound used to react with the silica material may be in the range of about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 30 wt %, about 15 wt % to about 30 wt %, about 20 wt % to about 30 wt %, or about 25 wt % to about 30 wt %, based on the weight of the silica particle.

The weight of the metal particles in the metal/silica composite nanoparticle is dependent on the ratio of silica particles and metal salt during the incipient wetness impregnation step for which the metal salt is loaded into the pores of the silica particles and is subsequently reduced to zero valent iron.

The polymer of the polymer solution may be dissolved in a mixture of alcohol and water. The alcohol may be selected from the group consisting of methanol, ethanol, 1-propanol, 2-propanol, 1,3-propanediol, 1-butanol, 2-butanol, 1,4-butanediol and 1,2,4-butanetriol.

The volume ratio of water content in the mixture of alcohol and water may be in the range of about 10% to 80%, about 10% to 70%, about 10% to 60%, about 10% to 50%, about 10% to 40%, about 10% to 30%, about 10% to 20%, about 20% to 80%, about 30% to 80%, about 40% to 80%, about 50% to 80%, about 60% to 80%, or about 70% to 80%. The volume ratio of water content in the mixture of alcohol and water may be preferably in the range of about 20% to 30%.

The polymer solution may be prepared at a temperature range of about 30° C. to about 100° C., about 30° C. to 90° C., about 30° C. to 80° C., about 30° C. to 70° C., about 30° C. to 60° C., about 30° C. to 50° C., about 30° C. to 40° C., about 40° C. to 100° C., about 50° C. to 100° C., about 60° C. to 100° C., about 70° C. to 100° C., about 80° C. to 100° C., or about 90° C. to 100° C. The polymer solution may be prepared preferably at a temperature range of about 60° C. to about 75° C.

The concentration of the polymer in the polymer solution may be in the range of about 0.01 wt % to about 30 wt %, about 0.01 wt % to about 25 wt %, about 0.01 wt % to about 20 wt %, about 0.01 wt % to about 15 wt %, about 0.01 wt % to about 10 wt %, about 0.01 wt % to about 5 wt %, about 0.01 wt % to about 1 wt %, about 0.01 wt % to about 0.5 wt %, about 0.01 wt % to about 0.25 wt %, about 0.01 wt % to about 0.1 wt %, about 0.1 wt % to about 30 wt %, about 0.15 wt % to about 30 wt %, about 0.25 wt % to about 30 wt %, about 0.5 wt % to about 30 wt %, about 1 wt % to about 30 wt %, about 5 wt % to about 30 wt %, about 10 wt % to about 30 wt %, about 15 wt % to about 30 wt %, about 20 wt % to about 30 wt %, or about 25 wt % to about 30 wt % or about 0.15 wt % to about 0.25 wt %. The concentration of the polymer in the polymer solution may be preferably in the range of about 0.15 wt % to about 0.25 wt %.

The polymer solution may be bubbled with nitrogen gas to remove the residue oxygen in the solution before mixing with a plurality of activated metal/silica particles.

The metal/silica particles may be mixed with a mixture of ethanol and water before activation. The mass content of the metal/silica particles in the ethanol and water mixture may be in the range of about 5 wt % to about 80 wt %, about 5 wt % to about 70 wt %, about 5 wt % to about 60 wt %, about 5 wt % to about 50 wt %, about 5 wt % to about 40 wt %, about 5 wt % to about 30 wt %, about 5 wt % to about 20 wt %, about 5 wt % to about 10 wt %, about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, or about 70 wt % to about 80 wt %. The mass content of the metal/silica particles in the ethanol and water mixture may be preferably in the range of about 7 to about 10 wt %.

The method may further comprise the step of activating a metal particle with a salt to form said activated metal. The activator may be sodium chloride. The concentration range of the sodium chloride water solution is about 5 wt % to about 30 wt %, about 8 wt % to about 30 wt %, about 10 wt % to about 30 wt %, about 15 wt % to about 30 wt %, about 20 wt % to about 30 wt %, about 25 wt % to about 30 wt %, about 5 wt % to about 25 wt %, about 5 wt % to about 20 wt %, about 5 wt % to about 15 wt %, about 5 wt % to about 10 wt % or about 5 wt % to about 8 wt %.

The freshly-prepared plurality of activated metal/silica particles may be added into the polymer solution in a dropwise manner under stirring. The stirring speed may be from about 100 rpm to about 2000 rpm, from about 100 rpm to about 1500 rpm, from about 100 rpm to about 1000 rpm, from about 100 rpm to about 800 rpm, from about 100 rpm to about 500 rpm, from about 100 rpm to about 200 rpm, from about 200 rpm to about 2000 rpm, from about 500 rpm to about 2000 rpm, from about 800 rpm to about 2000 rpm, from about 1000 rpm to about 2000 rpm, or from about 1500 rpm to about 2000 rpm.

The present disclosure also relates to use of the composite material as defined herein as oxygen scavenger material.

The present disclosure also relates to a method of forming an oxygen scavenging or oxygen barrier film comprising the step of compounding or coating a substrate with a composite material as defined herein.

The composite material may be used as oxygen scavenger in the form of sachet directly. The composite material may also be incorporated into polymer films via coating, co-extrusion or blown technology. By modifying the compounding condition, transparent oxygen scavenging polymer films could be fabricated.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 2(a) is a TEM image of iron/silica nanoparticles without polymeric coating. FIG. 2(b) is a TEM image of ethylene vinyl alcohol copolymer (EVOH) coated iron/silica nanoparticles prepared by using 0.1 wt % EVOH solution. FIG. 2(c) is a TEM image of EVOH coated iron/silica nanoparticles prepared by using 0.15 wt % EVOH solution. FIG. 2(d) is a TEM image of EVOH coated iron/silica nanoparticles prepared by using 0.3 wt % EVOH solution.

FIG. 3(a) is an optical image of compressed EVOH pellets which were made from of 5 wt % iron/silica nanoparticles. The inset here is a photograph of the corresponding compressed EVOH pellets. FIG. 3(b) is an optical image of compressed EVOH pellets which were made from of 5 wt % EVOH coated Iron/silica nanoparticles. The inset here is a photograph of the corresponding compressed EVOH pellets.

DETAILED DESCRIPTION OF FIGURES

Figure 1:
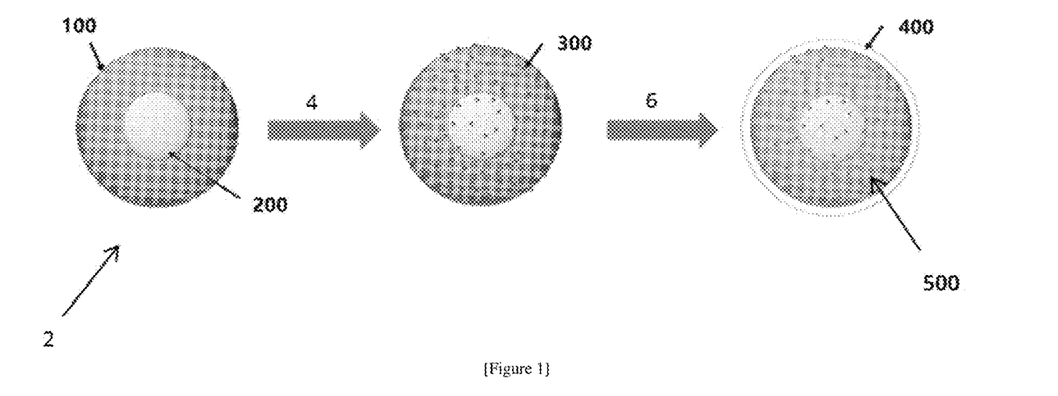
FIG. 1 is a schematic diagram showing the process 2 of forming a composite material as defined herein.

As shown in FIG. 1, there is provided a process 2 of forming a composite material 500 comprising a porous silica particle 200, a plurality of metal particles 300 disposed within the pores 100 of the silica particle 200 and a polymeric coating 400 that at least partially encapsulates the silica particle 200. Initially, a silica particle 200 having pores 100 is provided, which is then subjected to a pore enlargement step 4 to increase the size of the pores 100 in order to allow the metal particles 300 to be disposed within the pores 100. As the size of the pores 100 increased, more metal particles 300 can be present within the silica particle 200. This is then subjected to a polymeric coating step 6 whereby the metal/silica particle is added to a polymer solution which forms a polymeric coating 400 on the metal/silica particle to form the resultant composite material 500.

EXAMPLES

Non-limiting examples of the invention will be further described in greater detail by reference to specific Examples, which should not be construed as in any way limiting the scope of the invention.

Materials and Methods

Cetyl trimethylammonium bromide (CTAB), ferric chloride (FeCl3), sodium chloride (NaCl), ethylene vinyl alcohol copolymer (EVOH), aminopropyltriethoxysilane (APTES), tetraethyl orthosilicate (TEOS), ethanol, ethyl ester and sodium borohydride were purchased from Sigma Aldrich Singapore. Ammonia (30%) was purchased from Honeywell Singapore. Sodium hydroxide (NaOH) was purchased from Merck Singapore.

Example 1: Preparation of Porous Iron/Silica from Mesoporous Silica Nanoparticles 0.6 g of CTAB was dissolved in 70 mL of water and mixed with 0.6 mL of ammonia solution (30%) and 20 mL ethyl ester. The resulting solution was stirred at 500 rpm at 30° C. for 30 minutes. With vigorous stirring, 3.5 mL TEOS was added into the solution dropwisely in 10 minutes. After the addition of TEOS, the mixture was stirred for 12 hours at 30° C. The resulting mesoporous silica nanoparticles were purified through centrifugation at 9000 rpm for 10 minutes and washed with ethanol twice. The silica nanoparticles were re-dispersed in ethanol solution with 1M hydrochloric acid. The suspension was stirred at 500 rpm at 60° C. for 5 hours and then purified by centrifugation at 9000 rpm for 10 minutes to remove excess CTAB molecules in the silica particles. The step for the removal of CTAB was repeated to ensure most of the CTAB was eliminated from the silica nanoparticles. The particles were air dried and then vacuum dried at room temperature.

For the preparation of iron/silica nanoparticles, 1 g of mesoporous silica nanoparticles were dispersed in 25 mL of water. Then, another solution of ferric chloride (0.25 g) was added into the suspension in a dropwise manner. The suspension was stirred for 12 hours to ensure the adsorption of Fe ions in the channels of mesoporous silica. With vigorous stirring, 2 mL solution of sodium borohydride (0.2 g) was added into the silica suspension in a dropwise manner. The final product was purified via centrifugation and re-dispersed in mixture of ethanol and water with volume ratio of 7:3.

Example 2: Preparation and Oxygen Scavenging Test of Porous Iron/Silica Composite Nanoparticles with Enlarged Pore Size To prepare mesoporous silica etched by 0.1 wt % NaOH and treated with 10 wt % APTES, porous silica nanoparticles were prepared according to the steps in Example 1. 1 g of porous silica nanoparticles were dispersed in 500 mL ethanol. 10 mL sodium hydroxide (NaOH) solution (0.1 wt %) was added into the suspension and stirred for 3 hours at room temperature. After purified by centrifugation, porous silica nanoparticles were re-dispersed in ethanol solution with 0.1 g APTES. The mixture was kept stirring for 1 hour at room temperature and then the nanoparticles were collected through centrifugation.

To prepare mesoporous silica annealed at 300° C. and treated with 10 wt % APTES, porous silica nanoparticles were prepared according to the steps in Example 1. 1 g of porous silica nanoparticles were annealed in oven 300° C. for 1 hr. Then, porous silica nanoparticles were re-dispersed in ethanol solution with 0.1 g APTES. The mixture was kept stirring for 1 hour at room temperature and then the nanoparticles were collected through centrifugation.

Table 1 shows the pore size, iron loading and oxygen scavenging performance of the iron/silica composite without treatment, with chemical etching and silane treatment, and with annealing and silane treatment.

| Mesoporous silica with 60 wt % of iron based on feeding ratio | Pore size of mesoporous silica (nm) | Iron loading of iron/silica based on ICP characterization (wt %) | Oxygen scavenging capacity of iron/silica (cc/g of scavenger) | Oxygen scavenging capacity of iron/silica based on ICP result (cc/g Fe) |
|---|---|---|---|---|
| Mesoporous silica without treatment | 8.2 | 51.1 | 73.5 | 143.8 |
| Mesoporous silica etched by 0.1 wt % NaOH and treated with 10 wt % APTES | 25.0 | 55.2 | 91.7 | 166.1 |
| Mesoporous silica annealed at 300° C. and treated with 10 wt % APTES | 15.1 | 48.2 | 80.5 | 167.1 |

Example 3: Preparation of Polymer Coated Iron/Silica Nanoparticles

Figure 2:
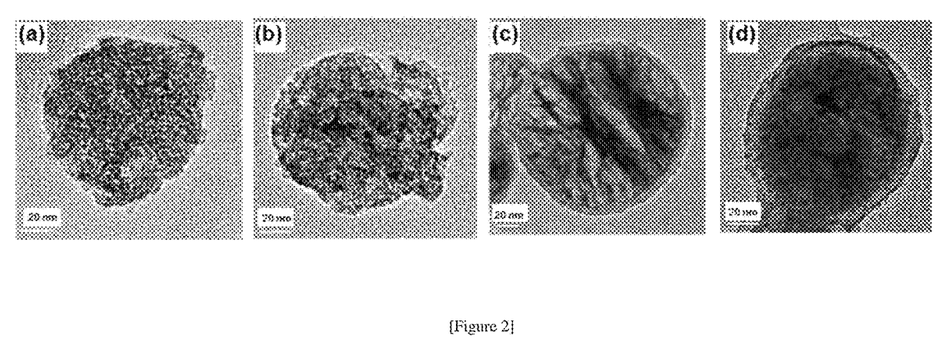
FIG. 2 shows a number of transmission electron microscopy (TEM) images of iron/silica nanoparticles with and without polymeric coating.

EVOH pellets were dissolved in a mixture of isopropanol and water with volume ratio of 7 to 3 at 65° C. 100 mL of the EVOH solution was placed in a reagent bottle and stirred at 65° C., bubbled with nitrogen gas for 20 minutes to fully remove the residue oxygen in the solution. Sodium chloride water solution was added into the iron/silica ethanol/water mixture with mass content of 10 wt % of the iron/silica nanoparticles. Then, 50 mL ethanol/water solution with 0.5 g iron/silica nanoparticles was added dropwisely into the EVOH solution. The suspension was cooled to room temperature, bubbled with nitrogen. 20 mL of water that had been bubbled with nitrogen for 10 minutes was added into the suspension in a dropwise manner. The EVOH coated iron/silica nanoparticles was purified by centrifugation and dried at 50° C. in vacuum oven. The TEM images of (a) iron/silica nanoparticles, and ethylene vinyl alcohol copolymer (EVOH) coated iron/silica nanoparticles prepared by using EVOH solution with (b) 0.1 wt %, (c) 0.15 wt % and (d) 0.3 wt % EVOH are shown in FIG. 2. As shown in FIG. 2(b), ethylene vinyl alcohol copolymer (EVOH) coating was not observed. As shown in FIG. 2(c), the EVOH polymeric layer had a thickness of 5 nm. As shown in FIG. 2(d), the EVOH polymeric layer had a thickness of 10 nm.

Example 4: Oxygen Scavenging Test of EVOH Coated Iron/Silica Nanoparticles

To evaluate the oxygen scavenging performance of EVOH coated iron/silica nanoparticles, 0.1 g of each sample obtained from Example 3 was placed into a 25 ml glass conical flask. A vial containing 1 ml of water was placed inside the flask to adjust the room humidity (RH) to 100%. Then, the flask was sealed by a gas-tight rubber septum stopper and placed at room temperature for the duration of the oxygen scavenging experiment. The oxygen scavenging performance of the EVOH coated iron/silica nanoparticles are listed in Table 2. The polymer coating thickness of the iron/silica sample with 0.1 wt % EVOH was about 1 nm. The polymer coating thickness of the sample with 0.15% EVOH was about 5 nm and the polymer coating thickness of the sample with 0.3% EVOH was about 10 nm. For reference, the (non-polymeric coated) iron/silica nanoparticles showed scavenging capacity of 193.1 cc/g Fe. The EVOH coated iron/silica nanoparticles prepared by EVOH solution with 0.15 wt % EVOH gave higher oxygen scavenging capacity (211 cc/g Fe).

Table 2 shows the oxygen scavenging performance of iron/silica and EVOH coated iron/silica nanoparticles prepared using different EVOH solution.

| Test at room temperature and 100% humidity | | Oxygen scavenging capacity (cc/g Fe) |
|---|---|---|
| | Iron/Silica (ICP of Fe: 34.7 wt %) | 193.1 |
| EVOH coated Iron/silica | EVOH solution with 0.1 wt % EVOH (ICP of Fe: 30.1 wt %) | 116.7 |
| | EVOH solution with 0.15 wt % EVOH (ICP of Fe: 29.7 wt %) | 211 |
| | EVOH solution with 0.3 wt % EVOH (ICP of Fe: 20.1 wt %) | 164 |

Oxygen scavenger with thicker EVOH coating took longer time to achieve saturated oxygen scavenging capacity. The saturated scavenging capacity of the sample with 0.3 wt % EVOH could be higher than 164. The sample with 0.15 wt % EVOH had better performance as compared to the sample with 0.3 wt % EVOH, mainly because of the barrier property of EVOH against oxygen to reduce oxygen diffused into silica to be consumed. Little amount of EVOH cannot block oxygen effectively, while too high amount of EVOH hinder the diffusion of oxygen significantly. The optimized range of EVOH concentration should be 0.15 to 0.25 wt %.

Figure 3:
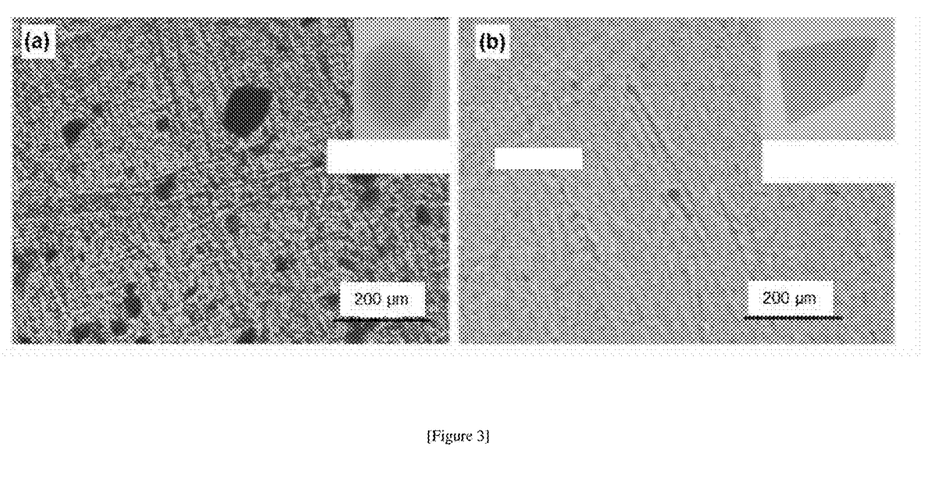
FIG. 3 shows a number of optical images of compressed EVOH pellets.

Example 5: Preparation of Polymer Composites with EVOH Coated Iron/Silica Nanoparticles Iron/silica nanoparticles and EVOH coated Iron/silica nanoparticles (prepared by using 0.15 wt % EVOH solution) were mixed with EVOH pellets and compounded through twin screw extruder, flushed with nitrogen gas. The mass content of Iron/silica and EVOH coated Iron/silica nanoparticles were kept at 5 wt %. The resulting polymer pellets were compressed to form thin films via hot press. As shown in FIG. 2, much less aggregation of nanoparticles were observed in the sample with EVOH coated iron/silica, resulting in more transparent films. Furthermore, the EVOH pellets with EVOH coated iron/silica possessed higher oxygen scavenging capacity (1.14 cc/g of pellet) than the sample compounded with iron/silica (0.52 cc/g of pellet). The optical images of the compressed EVOH pellets with (a) 5 wt % iron/silica nanoparticles and (b) 5 wt % EVOH coated Iron/silica nanoparticles and the photographs of the corresponding compressed EVOH pellets are shown in FIG. 3. Much less aggregation of iron/silica nanoparticles were observed in the sample with EVOH coated iron/silica nanoparticles as shown in the optical images, resulting in more transparent films as shown in the inlets. The film shown in inlet of FIG. 3a had a thickness of 140 µm. The film shown in inlet of FIG. 3a had a thickness of 70 µm Table 3 shows the oxygen scavenging performance of EVOH pellets compounded with iron/silica and EVOH coated iron/silica nanoparticles

| Test at 100° C. with 100% humidity | Oxygen Scavenging Capacity (cc/ gram of pellet) |
|---|---|
| 5 wt % Iron/silica compounded with EVOH | 0.52 |
| 5 wt % polymer protected Iron/Silica (0.15 wt % EVOH) compounded with EVOH | 1.14 |

INDUSTRIAL APPLICABILITY

In the present disclosure, the composite material may be used as oxygen scavenger to be placed in containers such as laminated sheets, sachets, and permeable bags. The composite material may also be used as oxygen scavenger to be integrated into polymer matrix via compounding or coating to form an oxygen scavenging or oxygen barrier plastic film.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A composite material comprising a porous silica particle, a plurality of metal particles disposed within pores of said silica particle, and a polymeric coating that at least partially encapsulates said silica particle, wherein a thickness of the polymeric coating is in a range of 5 nm to 10 nm.

2. The composite material according to claim 1, wherein the silica particle is modified with a silane compound.

3. The composite material according to claim 2, wherein the silane compound is functionalized with an amino group or a carboxylic group.

4. The composite material according to claim 1, wherein the metal of the metal particle particles is selected from Group 8 of the Periodic Table.

5. The composite material according to claim 1, wherein the metal of the metal particles is iron.

6. The composite material according to claim 1, wherein a size of the metal particles is less than 100 nm, or wherein a size of the porous silica particle is in a range of 20 nm to 1 µm, or wherein a pore size of the porous silica particle is in a range of 5 nm to 50 nm, or wherein a weight of the metal particles in the composite material is in a range of 1 wt. % to 80 wt. % based on a dry weight of the porous silica particle.

7. The composite material according to claim 1, further comprising an activator.

8. The composite material according to claim 7, wherein the activator is a halide salt.

9. The composite material according to claim 1, wherein the polymeric coating comprises a polymer having a monomer selected from the group consisting of urethane, acrylate, methacrylate, epoxy, ethylene, vinyl alcohol, and mixtures thereof.

10. The composite material according to claim 1, wherein the composite material has an oxygen scavenging performance in a range of 210 $cm^3$/g to 230 $cm^3$/g.

11. A method of preparing a composite material, comprising a step of mixing a solution containing a plurality of activated metal particles and silica particles with a polymer solution to thereby form said composite material, wherein said composite material comprises a porous silica particle, a plurality of metal particles disposed within the pores of said silica particle, and a polymeric coating that at least partially encapsulates said silica particle, wherein a thickness of the polymeric coating is in a range of 5 nm to 10 nm.

12. The method according to claim 11, further comprising a step of annealing or chemical etching to enlarge a pore size of the silica particle.

13. The method according to claim 12, comprising undertaking the annealing step at a temperature range of 100° C. to 700° C., or wherein the chemical etching step comprises the use of an alkali salt solution.

14. The method according to claim 13, wherein an amount of alkali salt in said solution is in a range of 0.01 wt. % to 5 wt. % of the silica particle.

15. The method according to claim 11, further comprising a step of modifying the silica particles with a silane compound.

16. The method according to claim 15, wherein the silane compound is functionalized with an amino group or a carboxylic group.

17. The method according to claim 11, wherein the polymer of the polymer solution is dissolved in a mixture of alcohol and water.

18. The method according to claim 11, wherein a concentration of the polymer in the polymer solution is in a range of 0.01 wt. % to 10 wt. %.

19. The method according to claim 11, further comprising a step of activating a metal particle with a salt to form said activated metal.

20. A method of forming an oxygen scavenging or oxygen barrier film comprising a step of compounding or coating a substrate with a composite material as defined in claim 1.

* * * * *